United States Patent [19]

Chin-Wun

[11] Patent Number: 4,469,405

[45] Date of Patent: Sep. 4, 1984

[54] BACK VIEW MIRROR ASSEMBLY

[76] Inventor: Su Chin-Wun, No. 642-1, Shin Hsin Raod, Ou Jih, Hsiang Taichung Hsien, Taiwan

[21] Appl. No.: 414,309

[22] Filed: Sep. 2, 1982

[51] Int. Cl.³ .......................... G02B 5/08; G02B 5/12; G02B 5/10

[52] U.S. Cl. .................................. 350/302; 350/289; 350/307

[58] Field of Search ........................ 350/302, 307, 289

[56] References Cited

U.S. PATENT DOCUMENTS

| | | | |
|---|---|---|---|
| 1,986,033 | 1/1935 | Trufant | 350/302 |
| 3,704,063 | 11/1972 | Guthrie | 350/302 |
| 3,744,885 | 7/1973 | Hurtado et al. | 350/302 X |
| 4,153,342 | 5/1979 | Mittelhauser | 350/289 |

Primary Examiner—John K. Corbin
Assistant Examiner—Richard F. Gallivan
Attorney, Agent, or Firm—Cushman, Darby & Cushman

[57] ABSTRACT

A back view mirror assembly comprises, a first casing mounted on the rear top of a vehicle body, a convex mirror for reflecting the back view of the vehicle, first means for holding the convex mirror movably mounted in the first casing and capable of extending the convex mirror out of the first casing and beyond the rear top end of the vehicle body so that the reflection from the convex mirror can cause the driver to see the back view, and first means for operating the first holding means to longitudinally move inward and outward so that the convex mirror can be stowed when not in use and can be extended outward when in use. Alternatively, the assembly may comprise two casings, one being at the rear top end and other being at the front top end of the vehicle body. A mirror is further provided in the front casing for reflecting the rays emerging from the convex mirror.

11 Claims, 6 Drawing Figures

FIG·3

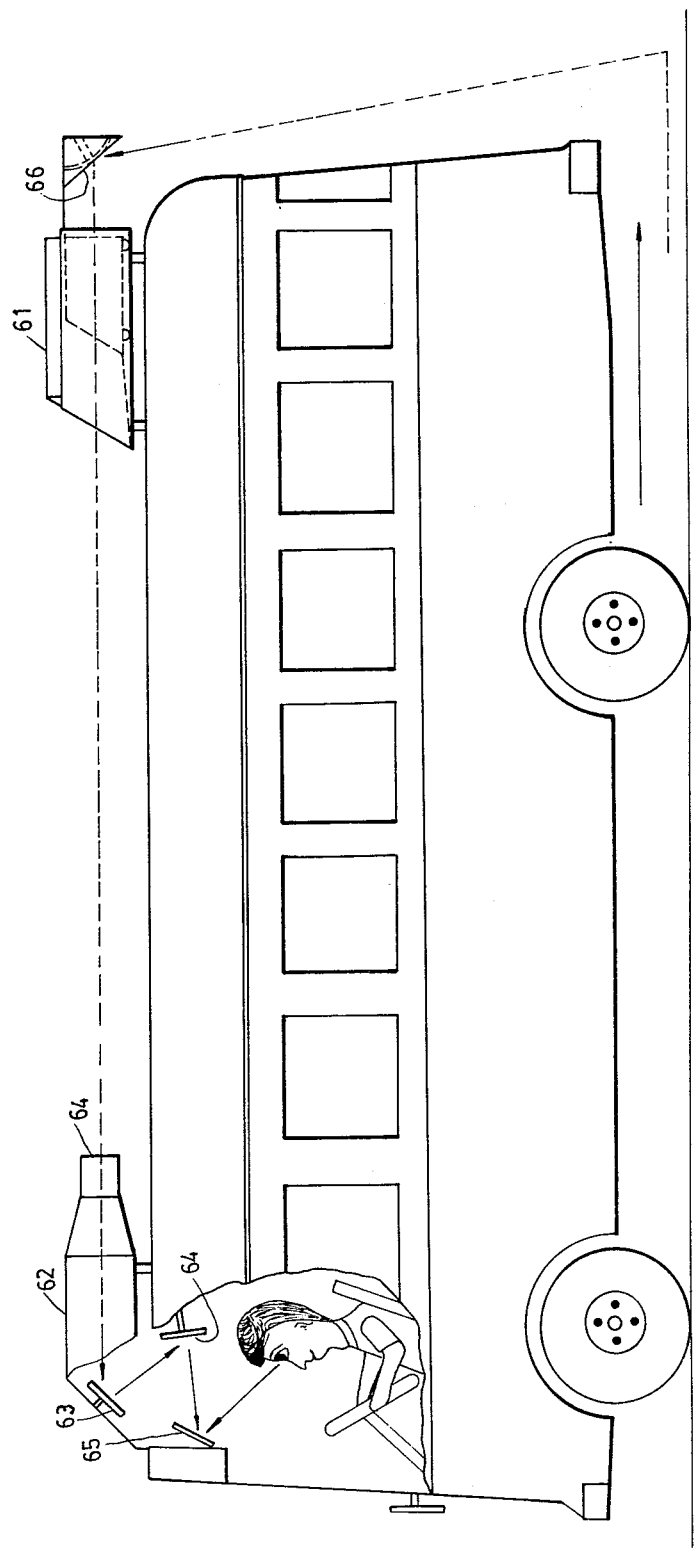

BACK VIEW MIRROR ASSEMBLY

BACKGROUND OF THE INVENTION

This invention relates to a back view mirror, particularly, to a back view mirror assembly by which the driver can see the view straight backward of the car body.

Various forms of rear view mirror have existed for the purpose of inspecting what is happening or exists at the back of the car. However there is an advantage that such rear view mirrors can not provide the view straight backward of the car. Therefore, when a car is to be backed up the driver can now know what is happened after the rear end of the car body. This may cause undesirable event, even sometimes, car accident.

SUMMARY OF THE INVENTION

According to the present invention, a back view mirror comprises: a first casing mounted on the rear top of the body of the vehicle and having a first opening at the rear end thereof; a convex mirror for reflecting the rear view of the vehicle; first means for holding the convex mirror mounted movably in the first casing and capable of extending the convex mirror out of the first casing and beyond the rear top end of the vehicle body so that the reflection from the convex mirror can cause the driver to see the rear view of the vehicle; first means for operating the first holding means to longitudinally move inward and outward so that the convex mirror can be stowed when not in use and can be extended outward when in use.

According to an aspect of the invention, the first operating means comprises, a first drive means having a first rotating shaft, a first longitudinal cylindrical member having one end fixed to the first shaft and lying longitudinally relative to the length of the vehicle body, first bearing means for supporting another end of the first longitudinal member fixedly mounted in the first casing, first two helical grooves one of which is provided lefthanded and another of which is provided right-handed on the first longitudinal member to impart inward and outward movement of the first holding means, and first switch means for stopping the first drive means at the end of inward and outward movements of the holding means.

According to another aspect of the invention, the first holding means comprises, a movable member mounted on the longitudinal member, engaged with the helical grooves, and having first wheel means for rolling in the first casing, lever means connected to the movable member and the first convex mirror at the end thereof, the center line of the convex mirror inclining at a predetermined angle relative to a vertical line.

According to further aspect of the invention, the back view mirror device further comprises a second opening at the front end thereof, and the first holding means comprises, a first tube member provided in the first casing with the ends thereof directed toward first and second openings and having second wheel means for rolling in the first casing, a first arm portion extended longitudinally from the rear top of the first tube member and connected to the first convex mirror, the center line of the first convex mirror inclining downward at a predetermined angle relative to a vertical line, and a movable member mounted on the first longitudinal member, engaged with the first helical grooves and connected to the first tube member.

According to still further aspect of the invention, the movable member comprises a rectangular block sleeved onto the first longitudinal member, a blind channel bored at one side of the rectangular block, the axis of the blind channel being perpendicular to the axis of the first longitudinal member, a circular plate fitly inserted in the blind channel, and tooth means provided on one side of the circular plate and engaged with the first helical grooves.

In this aspect, the back view mirror further comprises a second casing which is provided with a second mirror held by a second holding means which is operated by second drive means, the assembly being similar to that comprising the first convex mirror. The second casing is mounted on the front top of the vehicle body and the second mirror can be extended beyond the foremost of the vehicle body and reflects the rays emerged from the image formed in the first convex mirror, whereby the driver can see the back view straight backward of the vehicle.

In still further aspect of the invention, more than one mirror are used in place of the second mirror. These mirrors are oriented at predetermined inclining angles and distances for effecting reflection of rays emerging from the image formed in the first convex mirror so that the driver can see the back view straight backward of the vehicle.

An object of the invention is to provide a back view mirror assembly which can provide a view straight backward of the car so that the car can be safely backed up.

This and other objects, features and advantages of the present invention will be more apparent in the following description of a preferred embodiment with reference to the accompanying drawings, in which:

BRIEF DESCRIPTION OF THE DRAWINGS

FIG. 6 is a view illustrating the back view assembly of the third embodiment in conjunction with the vehicle body.

DETAILED DESCRIPTION OF THE PREFERRED EMBODIMENT

Figure 1:
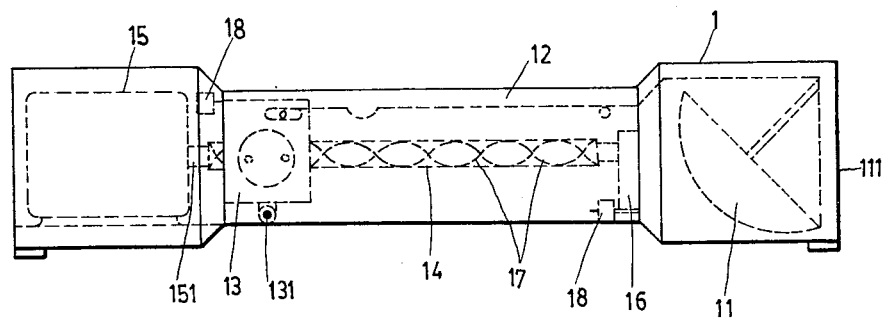
FIG. 1 is a side view of the back view assembly of the first embodiment.
Figure 2:
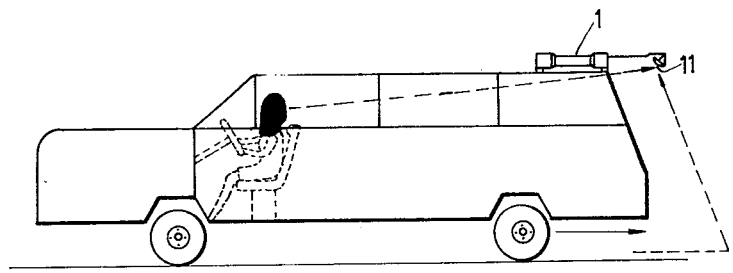
FIG. 2 is a view illustrating the back view assembly of FIG. 1 in conjunction with a vehicle body.

In an illustration of a first embodiment, the back view mirror assembly includes a casing 1 which is mounted at the rear top end of a car body as shown in FIGS. 1 and 2. the casing 1 houses a convex mirror 11 which is held by a holding means movably mounted in the casing 1 and can move out of the casing 1 through an open end 111 thereof for extending the convex mirror 11 beyond the rear top end of the car body, as best shown in FIG. 2 so that the view straight backward of the car can be reflected in the convex mirror 11 and the driver can see this view when he turns his head backward.

As embodied herein, the holding means includes a lever 12 at the end thereof. The convex mirror 11 is mounted in a position in which the center line thereof inclines downward at a predetermined angle relative to a vertical line. The lever is in turn connected to a rectangular block member 13 which has a wheel 131 for rolling in the casing 1 and is sleeved onto a longitudinal cylindrical member 14 that will impart a movement.

Referring again to FIG. 1. there is further provided an operating means whch comprises a D.C. motor 15 mounted in the casing 1 and having a shaft 151 connected to one end of the longitudinal member 14. The other end of the longitudinal member 14 is support by a bearing member 16 which is mounted in the casing 1. On the periphery of the longitudinal member 14 are provided two helical grooves 17 one of which is left handed and another of which is right handed. These helical grooves 17 are engaged with the block member 13 so that the block member 13 can move along the longitudinal member 14 which is rotated by the motor 15. There are further provided two micro-switches 18 which will be turned off when the block member 13 acts on them at the ends of inward or outward movements of the mirror 11, thereby stopping the run of the motor as well as the inward movement of the block member 15. The engagement of helical grooves 14 with the block member 13 will be discussed hereinafter.

Figure 3:
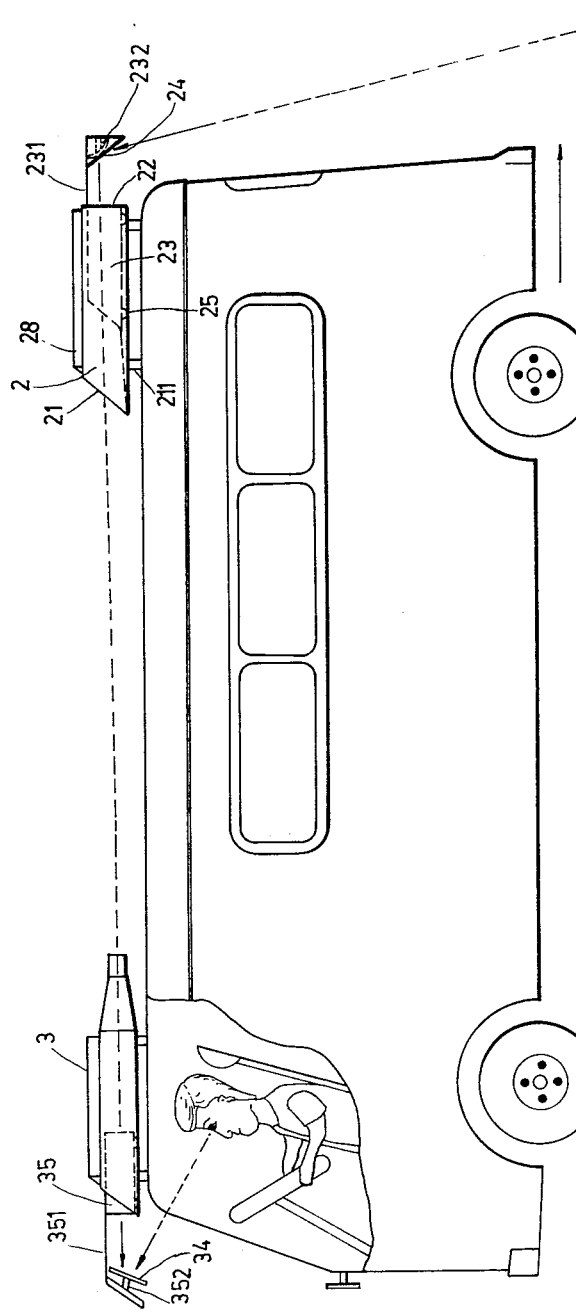
FIG. 3 is a view illustrating the back view assembly of the second embodiment in conuunction with a vehicle body.
Figure 4:
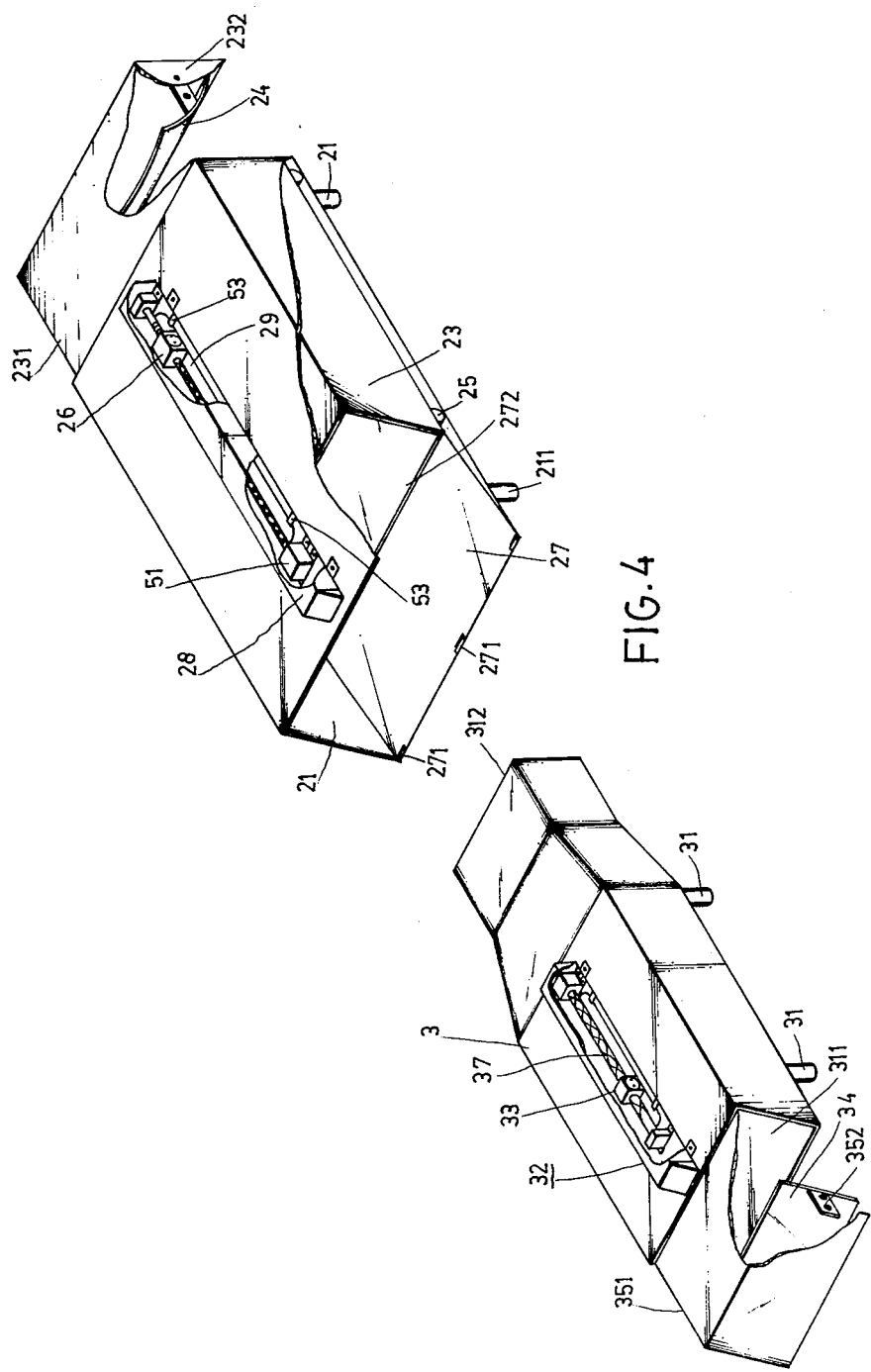
FIG. 4 is a perspective view of the back view assembly of the second embodiment.

In the illustration of the second embodiment, the back view mirror assembly comprises two casings 3 and 2 which are respectively mounted at the front top end and rear top end of the car body and each of which contains a mirror to cooperate with the mirror of the other for the reflection of the rear view of the car, as shown in FIG. 3, so that the driver can see it without turning his head. The casing 2 has two open ends 21 and 22 at the front and rear ends thereof and has leg means 211 at the bottom thereof for mounting on the car body. It is receiving a rectangular tube member 23 with its open ends 21 and 22 being aligned with the hollow section of the rectangular tube member 23 as shown in FIG. 4. The top side of the tube member 23 has a rearwardly extending portion 231 of which the end is angled and provided with bracket means 232 for supporting a convex mirror 24. The convex mirror 24 is in the position in which the center line thereof inclines downward at an angle relative to a vertical line and the rays emerged therefrom may pass through the open ends 21 and 22 and the rectangular tube member 23.

There are further provided wheel means 25 at the bottom of the tube member 23 and a movable rectangular block member 26 affixed to the top of the rectangular tube member 23 as best seen in FIG. 4, for rolling the tube member 23 inward and outward. The details of the rectangular block member 26 will be discussed hereinafter. The open end 21 is provided with a movable cover plate 27 for covering the casing 2 when the convex mirror 24 is kept therein. This cover plate 27 is mounted on the hook means 271 which are provided at the bottom edge of the front end of the casing 2. The top side edge 272 of the cover plate 27 is movably engaged with the slightly rolled bottom edge of the tube member 23 when the tube member 23 is at the end of outward movement. This cover plate 27 can be pushed upward, when the tube member 23 is rolled into the casing 2, to cover up the open end 21.

As embodied herein there is further provided an operating means for driving the tube member 23 so that the convex mirror 24 can be kept inside the casing 2 when not in use and can be extended beyond the rear end of the car body when in use. The operating means 5 is received in a housing 28 which is provided on the top of the casing 2 and communicates therewith through a longitudinal opening 29 of the casing 2, as may be appreciated from FIG. 4.

Figure 5:
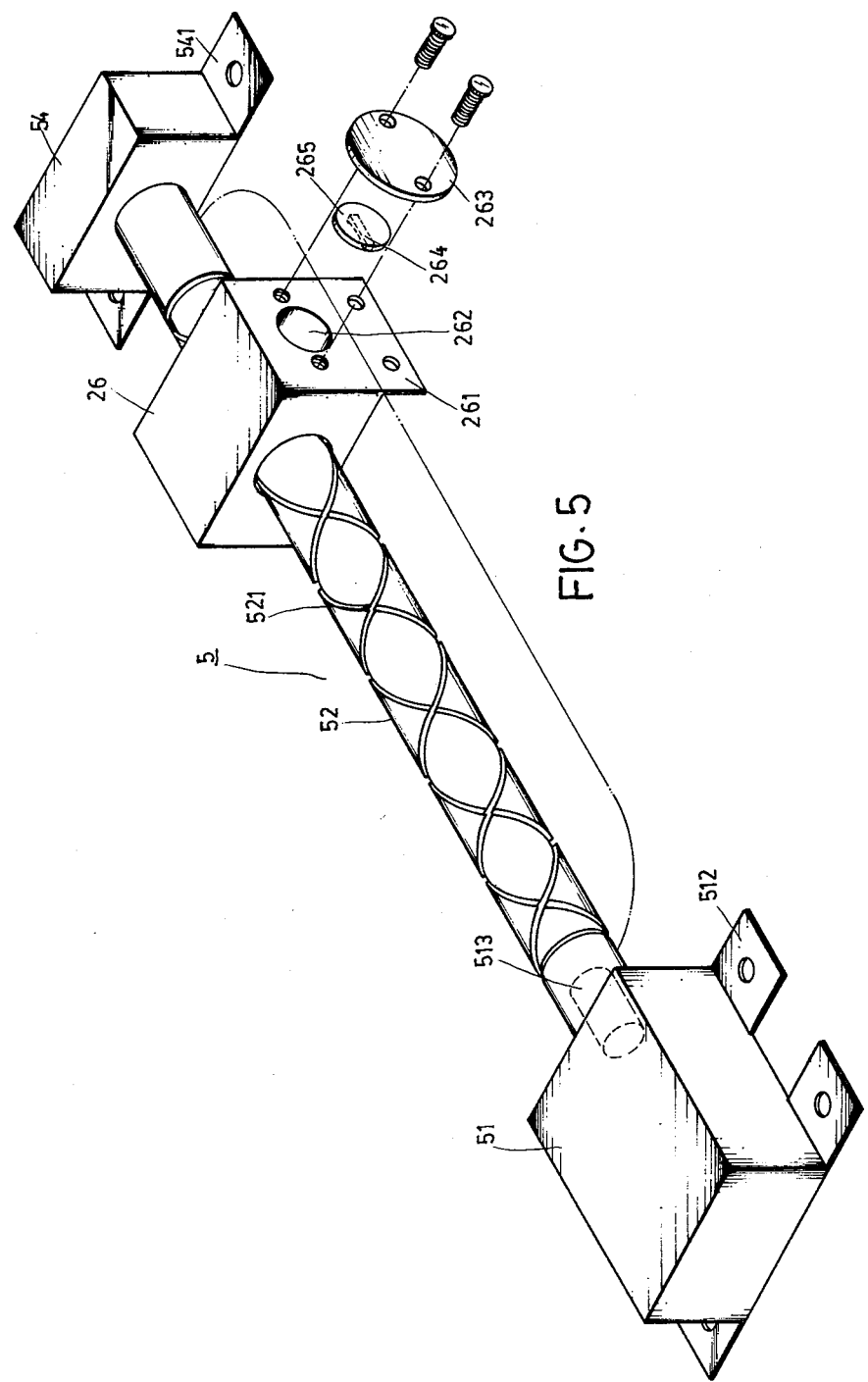
FIG. 5 is a perspective view of the operating means used in the invention.

Now referring to FIGS. 4 and 5, the operating means 5 comprises, a motor 51 mounted on the top of the casing 2 by screwing the base members 512. The motor 51 has a shaft 513 which is connected to one end of a longitudinal cylindrical member 52 for providing a rotational output. The other end of the cylindrical member 52 is supported by a bearing member 54 which has base members 541 screwed to the top of the casing 2. The cylindrical member 52 is provided with two helical grooves 521 one of which is left handed and another of which is right handed on the periphery thereof.

Referring again to FIGS. 4 and 5 the rectangular block member 26 which has projecting portion 261 screwed to the tube member 23 is sleeved onto the longitudinal cylindrical member 52, the helical grooves 521 being engaged with the block member 26. Therefore, when the cylindrical member 52 is rotated by the motor 511, the block member 26 is moved along the longitudinal axis of the cylindrical member 52, thereby imparting inward and outward movements of the tube member 23 as well as the convex mirror 24. There is further provided two micro switches 53 for controlling the motor 51. When the block member 26 reaches one end of the cylindrical member 32 at the end of the inward movement or outward movement, the block member 26 approaches and acts one of the switches 53 which, thereby, is turned off for stopping the running of the motor 51. It would be appreciated the operation of the motor 51 is initiated by the driver.

As embodied herein, the casing 3 has two open ends 311 and 312 at the front and rear ends thereof and has leg means 31 at the bottom thereof for mounting on the top of the car body. The front open end 311 is greater than the rear end 312 in their sections and are advantageously aligned with the open ends 21 and 22 of the casing 2, so that the rays emerged from the convex mirror 24 can pass through the open ends 311 and 312. There is further provided a rectangular tube member 35 in the casing 3 with the open ends 311 and 312 being aligned with the hollow section of the rectangular tube member 35 as best seen in FIG. 3. The top side of the tube member 35 has a forwardly extending portion 351 of which the end is angled and provided with bracket means 352 for supporting a plane mirror 34. The plane mirror 34 is in the position that can allow the driver to see the rear view when he slightly looks up.

Now referring again to FIG. 4 there are further provided wheel means (not shown) at the bottom of the tube member 35 and a movalbe rectangular block member 33, similar to the block member 26, affixed to the top of the rectangular tube member 35 for rolling the tube member 35 inward and outward. The driving force is provided by an operating means 32 which is constructed in the same way as the operating means 5 as described above. Therefore the details thereof will not be disclosed hereinunder. By means of the operating means 32 the tube member 35 as well as the plane mirror 34 can move inward or outward and the plane mirror 34 can extends beyond the front top end of the car body so that the driver can see the rear view reflected from the plane mirror 34 which receives the rays emerged from the convex mirror 24.

In the illustration of the third embodiment, the back view mirror assembly comprises, two casings 61 and 62 as shown in FIG. 6. The elements included in the casing 61 are the same construction and function as those of the casing 2 of the second embodiment and will not be described in detail hereinunder.

The casing 62 contains a plane mirror 63 which is inclinedly mounted at the front wall thereof. The open end 64 thereof is aligned with the open ends of the casing 61 so that the rays emerged from the convex mirror which is provided in the casing 61 can pass through the open end 64. At the front portion of the bottom of the casing 63 is provided an opening (not shown) which is in alignment with an opening (not shown) provided on the top of the car body so that the rays emerged from the plane mirror 63 can pass theretrough.

Referring again to FIG. 6, there are further provided two plane mirrors 64 and 64 which are oriented at predetermined angles and distances and mounted in the car body. It can be appreciated that the reflections of the convex mirror of the casing 61, the plane mirrors 63, 64 and 65 form an image of the rear view for the driver.

It was described in the first, second and third embodiments, that the rectangular tube members 23, 35, the lever 12 for holding the convex mirror 24, the plane mirror 34 and the convex mirror 11 are attached with movable block members 26, 33 and 13 which are sleeved onto longitudinal cylindrical members 52, 37 and 14 and engaged with the helical grooves provided thereon. Hereinunder, there is described a preferred construction for the movable block members 26, 33 and 13 with reference to FIG. 5. As shown in FIG. 5, the movable rectangular block member 26, is provided with, at one side thereof, a blind channel 262 the axis of which is substantially perpendicular to the axis of the longitudinal cylindrical member 52. A circular plate 265 is fitly inserted in the blind channel 262 and has a projected tooth member 264 for engaging with the helical grooves 521 of the cylindrical member 52. A cover plate 263 is screwed to the side face of the block member 26. It can be understood that the engagements of the left-handded and right handed helical grooves 521 with the tooth member 264 make the block member 26 move from one end to another along the longitudinal cylindrical member 52 when the shaft 513 rotates.

With the invention thus explained, it is apparent that obvious modifications and variations can be made without departing from the scope of the invention. It is therefore intended that the invention be limited only as indicated in the appended claims.

What I claim is:

1. A back view mirror assembly for a vehicle comprising;
    a first casing mounted on the rear top of the body of said vehicle and having a first opening at the rear end thereof;
    a first mirror for reflecting the back view of the vehicle;
    first means for holding said first mirror movably mounted in said first casing and capable of extending said first mirror out of said first casing and beyond the rear top end of the vehicle body so that the reflection from said first mirror can cause the driver to see the rear view of the vehicle;
    first means for operating said first holding means to longitudinally move inward and outward so that said first mirror can be stowed when not in use and can be extended outward when in use.

2. An assembly as claimed in claim 1, wherein said first operating means comprises, a first drive means having a first rotating shaft, a first longitudinal cylindrical member having one end fixed to said first shaft and lying longitudinally relative to the length of the vehicle body, first bearing means for supporting another end of said first longitudinal member fixedly mounted in said first casing, first two helical grooves one of which is provided right-handed and another of which is provided left-handed on said first longitudinal member to cause inward and outward movements of said first holding means, and first switch means for stopping said first drive means at the end of inward or outward movement.

3. An assembly as claimed in claim 2, wherein said first holding means comprises, a support member connected to said first mirror, a movable block member affixed to said support member and engaged with said first helical grooves, and wheel means cooperative with said support member and said movable block member for providing a rolling action.

4. An assembly as claimed in claim 3, wherein said movable block member includes, a rectangular block sleeved onto said first longitudinal member, a blind channel bored at one side of said rectangular block, the axis of said blind channel being perpendicular to the axis of said first longitudinal member, a circular plate fitly inserted in said blind channel, and tooth means provided on one side of said circular plate and engaged with said first helical grooves.

5. An assembly as claimed in claim 4, wherein said support member is an elongated member having one end thereof connected to the top of said rectangular block member and another end thereof connected to said first mirror, said wheel means being provided at the bottom of said block member.

6. An assembly as claimed in claim 4, in which said first casing further includes a second opening at the front end thereof, wherein said support member comprises, a rectangular tube member provided in said first casing with its hollow section being aligned with said first and second openings, said movable rectangular block member being affixed to the top of said rectangular tube member and said wheel means being provided at the bottom of said rectangular tube member, the top side of said rectangular tube having an extended portion of which the end is angled and supporting said first mirror.

7. An assembly as claimed in claims 1, 2, 3, 4, 5 or 6, wherein said first mirror is a convex mirror.

8. An assembly as claimed in claim 6, further comprising,
    a second casing mounted on the front top of the body of said vehicle and having a third opening and fourth opening at the front and rear ends thereof, said third and fourth openings being aligned with said first and second openings,
    a second mirror for reflecting the rays from said first mirror, second means for holding said second mirror movably mounted in said second casing and capable of extending said second mirror out of said second casing and beyond the front end of the vehicle body so that the reflection from said first mirror and said second mirror can cause the driver to see the rear view of the vehicle, second means for operating said second holding means to longitudinally move inward and outward so that said second mirror can be stowed when not in use and can be extended outward when in use.

9. An assembly as claimed in claim 7, wherein said second operating means comprises, a second drive means having a second rotating shaft, a second longitudinal cylindrical member having one end fixed to said second shaft and lying longitudinally relative to the length of the vehicle, second bearing means for supporting another end of said second longitudinal member fixedly mounted on said second casing, two helical grooves one of which is provided right-handed and another of which is provided left-handed on said second longitudinal member to cause inward and outward movement of said first holding means, and switch means for stopping the run of said second drive means at the end of inward or outward movement.

10. An assembly as claimed in claim 8, wherein said second holding means comprises, a second rectangular tube member provided in said second casing with its hollow section being aligned with said third and fourth openings, wheel means provided at the bottom of said rectangular tube member, an extended portion projected forwardly from the top side of said rectangular tube member and supporting said second mirror at the end thereof, and a second movable rectangular block member affixed to the top of said rectangular tube member, sleeved on to said second longitudinal member and engaged with said second helical grooves.

11. An assembly as claimed in claim 6, further comprising, a third casing mounted on the front top of the vehicle body and having a fifth opening at the rear end thereof and a sixth opening provided at the bottom thereof, the top of the vehicle body having an opening to communicate with said sixth opening, a third mirror inclinedly mounted on the front wall of said third casing for reflecting the rays emerged from the image formed in said first mirror, at least two fourth plane mirrors mounted inside the vehicle body and oriented at predetermined inclining angles and distances for receiving the rays from said third mirror through said sixth opening and reflecting the back view for the driver.

* * * * *